(12) United States Patent
Park et al.

(10) Patent No.: US 12,139,010 B2
(45) Date of Patent: Nov. 12, 2024

(54) UNIVERSAL WHEEL DRIVING SYSTEM

(71) Applicants: Hyundai Motor Company, Seoul (KR); Kia Corporation, Seoul (KR)

(72) Inventors: Jong Sool Park, Hwaseong-Si (KR); Hyung Joon Lee, Hwaseong-Si (KR); Jong Chan Park, Seongnam-Si (KR); Jin Hyung Kong, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 318 days.

(21) Appl. No.: 17/890,521

(22) Filed: Aug. 18, 2022

(65) Prior Publication Data

US 2023/0311645 A1     Oct. 5, 2023

(30) Foreign Application Priority Data

Mar. 29, 2022   (KR) ......................... 10-2022-0038689

(51) Int. Cl.
*B60K 17/04* (2006.01)
*B60G 15/00* (2006.01)
(Continued)

(52) U.S. Cl.
CPC ............ *B60K 17/046* (2013.01); *B60G 15/00* (2013.01); *B60K 7/0007* (2013.01);
(Continued)

(58) Field of Classification Search
CPC ................ B60K 17/046; B60K 7/0007; B60K 2007/0046; B60K 2007/0092;
(Continued)

(56) References Cited

U.S. PATENT DOCUMENTS 2,144,964 A      1/1939  De Falco
3,315,547 A  *   4/1967  Fritsch .................. F16H 1/2836
                                                        475/346
(Continued)

FOREIGN PATENT DOCUMENTS

JP    2001-315534       11/2001
JP    2001315534 A  *  11/2001
(Continued)

*Primary Examiner* — Emma K Frick
*Assistant Examiner* — Michael T. Walsh
(74) *Attorney, Agent, or Firm* — Morgan, Lewis & Bockius LLP

(57) ABSTRACT

A universal wheel driving system includes a sun gear provided to receive power from a power source mounted in a vehicle body, a ring gear to which a wheel is concentrically connected, a gear train engaged to the sun gear and the ring gear and configured to transfer the power between the sun gear and the ring gear while allowing relative motion between the rotation shafts of the sun gear and the ring gear, a carrier supporting a final pinion of the gear train and gear-meshing with the ring gear so that a position of the rotation shaft of the final pinion remains unchanged with respect to a position of the rotation shaft of the ring gear, and a suspension portion provided to support the carrier against the sun gear so that the ring gear and the carrier move up and down with respect to the vehicle body.

20 Claims, 6 Drawing Sheets

(51) Int. Cl.
  *B60K 7/00*   (2006.01)
  *F16H 57/08*   (2006.01)
(52) U.S. Cl.
  CPC .... *F16H 57/082* (2013.01); *B60K 2007/0046* (2013.01); *B60K 2007/0092* (2013.01)
(58) Field of Classification Search
  CPC ................ B60G 15/00; B60G 15/062; B60G 2202/312; B60G 2204/30; B60G 2204/4191; B60G 2300/50; F16H 57/082; F16H 57/0006; F16H 1/32; F16H 21/12; F16H 2001/327; F16H 1/28; F16H 57/08; F16H 57/0479; F16H 57/0482; F16H 1/2836; F16H 3/44; F16H 2200/2007; F16H 3/70
  See application file for complete search history.

(56) References Cited

U.S. PATENT DOCUMENTS

| | | | |
|---|---|---|---|
| 3,955,435 A * | 5/1976 | Arick | F16H 1/32 |
| | | | 74/411 |
| 3,990,328 A | 11/1976 | Galbraith | |
| 5,087,229 A | 2/1992 | Hewko | |
| 5,360,380 A * | 11/1994 | Nottle | F16H 3/76 |
| | | | 475/182 |
| 6,206,800 B1 | 3/2001 | Ka | |
| 11,571,966 B1 | 2/2023 | Park | |
| 11,639,101 B1 | 5/2023 | Park | |
| 2005/0192151 A1* | 9/2005 | Simon | F16H 3/663 |
| | | | 475/331 |
| 2007/0272458 A1 | 11/2007 | Taniguchi et al. | |
| 2012/0015771 A1* | 1/2012 | Haeusler | B60K 17/046 |
| | | | 475/183 |
| 2013/0017923 A1* | 1/2013 | Park | F16H 1/36 |
| | | | 475/331 |
| 2014/0011620 A1 | 1/2014 | Munster | |
| 2014/0315679 A1* | 10/2014 | Xu | F16H 57/08 |
| | | | 475/331 |
| 2015/0028658 A1 | 1/2015 | Friedmann | |
| 2015/0096823 A1* | 4/2015 | Raymond | B60K 1/02 |
| | | | 180/56 |
| 2017/0067539 A1* | 3/2017 | Matsumoto | F16H 1/36 |
| 2018/0163834 A1* | 6/2018 | Boguski | F16H 57/082 |
| 2018/0283514 A1* | 10/2018 | Malligere | F16H 21/50 |

FOREIGN PATENT DOCUMENTS

| | | | | |
|---|---|---|---|---|
| JP | 2017-159906 | | 9/2017 | |
| JP | 2017159906 A | * | 9/2017 | ......... B64C 25/405 |
| KR | 10-2014-0062538 | | 5/2014 | |

* cited by examiner

UNIVERSAL WHEEL DRIVING SYSTEM

CROSS REFERENCE TO RELATED APPLICATION

The present application claims priority to Korean Patent Application No. 10-2022-0038689, filed Mar. 29, 2022, the entire contents of which is incorporated herein for all purposes by this reference.

BACKGROUND OF THE PRESENT DISCLOSURE

Field of the Present Disclosure

The present disclosure relates to a technology for a driving system that receives power input from a rotational power source such as a motor or the like and outputs the changed rotational power to the wheel that contacts with the ground.

Description of Related Art

The driving system of a vehicle transfers the power of a rotational power source such as an engine, motor, or the like to a wheel to drive the vehicle.

Recently, an in-wheel motor driving system featuring a motor directly mounted inside a driving wheel has been proposed, but the in-wheel motor driving system is not widely employed due to the problems of shortened motor lifespan, reduced driving comfort caused by the increased unsprung mass, and the like.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a driving system that receives power from a rotational power source such as a motor or the like and outputs the changed rotational power, and various aspects of the present disclosure are directed to providing a universal wheel driving system which may decelerate the speed of the input power and increase the torque of the input power to ensure excellent hill climbing and acceleration driving performance of a vehicle, install a power source such as a motor or the like separately from a wheel which is subject to harsh shocks and vibrations to increase the lifespan of the power source, reduce the unsprung mass of the vehicle to ensure excellent driving comfort, keep transferring power from the power source in response to vertical movements of the wheel without using a constant velocity joint, and accordingly, reduce the space between the power source and the wheel to ultimately ensure excellent utilization of the space between the right and left wheels.

According to an exemplary embodiment of the present disclosure, the universal wheel driving system includes a sun gear provided to receive power from a power source mounted in a vehicle body, a ring gear which is provided so that the rotation shaft of the ring gear may move relative to the rotation shaft of the sun gear on a rotation plane parallel to a rotation plane of the sun gear and to which the wheel is concentrically connected, a gear train engaged to the sun gear and the ring gear and configured to transfer the power between the sun gear and the ring gear while allowing relative motion between the rotation shafts of the sun gear and the ring gear, a carrier supporting a final pinion of the gear train and gear-meshing with the ring gear so that a position of the rotation shaft of the final pinion remains unchanged with respect to a position of the rotation shaft of the ring gear, and a suspension portion provided to support the carrier against the sun gear so that the ring gear and the carrier move up and down with respect to the vehicle body.

The gear train may be provided through a plurality of links, a connection angle of which varies according to the relative motion between the rotation shafts of the sun gear and the ring gear.

The plurality of links may include a first link, a first end of which is connected to the rotation shaft of the sun gear and a second link connected to a second end of the first link, and a connecting portion between the first link and the second link may be provided with a joint pinion having the same number of teeth as the sun gear.

The second link may be provided with the final pinion gear-meshing with the ring gear, and the final pinion may have the same number of teeth as the sun gear.

The final pinion may transfer power from the sun gear to the ring gear by a series of gears passing through the joint pinion.

A plurality of gear trains may be provided in the circumferential direction of the sun gear.

The plurality of links includes a first link, a first end of which is connected to the rotation shaft of the sun gear and a second link connected to a second end of the first link, and the first link and the second link may be provided with rotation shafts including a series of gears configured to transfer power from the sun gear to the ring gear.

The even-numbered gears from the sun gear among the series of gears forming the gear train may have the same number of teeth as the sun gear.

A second gear from the sun gear may be a joint pinion provided concentrically with the rotation shaft of the first link and the second link, and a fourth gear from the sun gear may be the final pinion gear-meshing with the ring gear.

The sun gear and the joint pinion may gear-mesh with a first intermediate pinion including a rotation shaft provided in the first link, and the joint pinion and the final pinion may gear-mesh with a second intermediate pinion including a rotation shaft provided in the second link.

A plurality of gear trains may be provided in the circumferential direction of the sun gear, and each of the final pinions of the gear trains may be supported by the carrier so that the relative position of the final pinion with respect to each other remains unchanged and only rotation is allowed.

The gear train may be configured so that at least four gears gear-mesh in a row, and the rotation shaft of the gears may be rotatably supported by the plurality of links connected to each other in a row.

The gear train may be configured so that a relative phase of the sun gear and the ring gear remains unchanged with respect to the relative motion of the rotation shafts of the sun gear and the ring gear.

The final pinion gear-meshing with the ring gear among the gears may be supported by the carrier so that the orbiting around the sun gear is restrained and only rotation is allowed.

The power source may be fixed to the vehicle body, and the sun gear may be connected to the power source by an input shaft provided concentrically with the rotation axis of the power source.

The carrier may support a plurality of final pinions, the input shaft is connected to the sun gear through the carrier, and the carrier may be provided with a space portion to avoid interference with the input shaft.

The suspension portion may be elastically provided in up and down direction between the carrier and a sleeve to which the input shaft is rotatably mounted.

The suspension portion may include a shock absorber and a spring provided in parallel to each other between the sleeve and the carrier.

The suspension portion may be elastically provided in up and down direction between the carrier and a sleeve which is fixed to the vehicle body but allows free rotation of the input shaft.

The present disclosure may further include a sleeve which is fixed to the vehicle body to support the input shaft transferring power to the sun gear but that allows free rotation of the input shaft, and the suspension portion may be provided to support the carrier against the sleeve so that the ring gear and the carrier may move up and down with respect to the vehicle body.

The present disclosure may properly decelerate the speed of the input power and increase the torque of the input power from a power source such as a motor and the like to ensure excellent hill climbing and acceleration driving performance of the vehicle, install the power source such as a motor and the like separately from the wheel which is subject harsh shocks and vibrations to increase the lifespan of the power source, reduce the unsprung mass of the vehicle to ensure excellent driving comfort, keep transferring power from the power source in response to perpendicular movements of the wheel without using a constant velocity joint, and accordingly, reduce the space between the power source and the wheel to ultimately ensure excellent utilization of the space between the right and left wheels.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
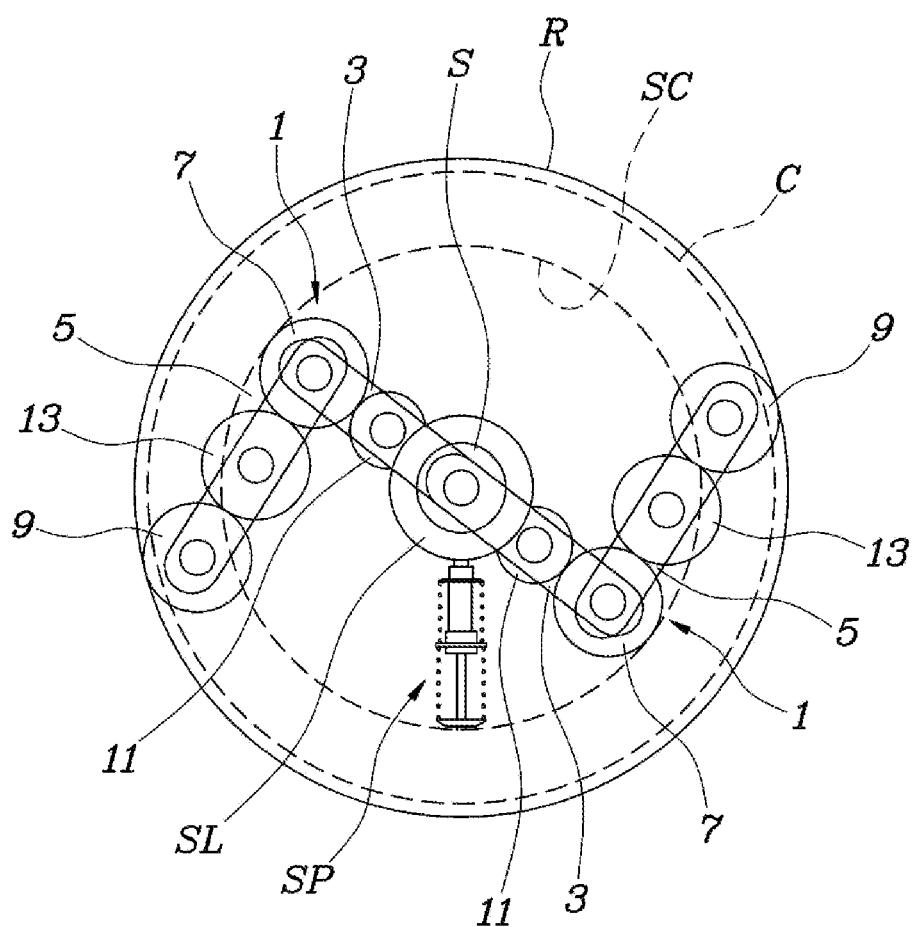
FIG. 1 is a view exemplarily illustrating various exemplary embodiments of a universal wheel driving system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The specific structural or functional descriptions of the embodiments included in the exemplary embodiment or application are merely exemplified for describing the embodiments according to an exemplary embodiment of the present disclosure. The embodiments of the present disclosure may be implemented in various forms, and the present disclosure is not to be interpreted as being limited to the embodiments described in the exemplary embodiment or application.

The exemplary embodiment of the present disclosure may be subject to various modifications and have various forms so that specific embodiments will be illustrated in the drawings and described in detail in the exemplary embodiment or application. It is to be understood that this is not intended to limit the embodiments according to the concept of the present disclosure to the specific included forms and that all modifications, equivalents, and substitutes within the spirit and technical scope of the present disclosure are included.

Terms such as first and/or second may be used in describing various components but the components are not to be limited by the terms. The terms may only be used for distinguishing one component from another. For example, without departing from the scope of the present disclosure, a first component may be denoted as a second component, and similarly, a second component may also be denoted as a first component.

When a component is referred to as being "connected" or "coupled" to another component, the component may be directly connected or coupled to the another component, but it is to be understood that other components may exist in between. On the other hand, when a component is referred to as being "directly connected" or "directly coupled" to another component, it is to be understood that there are no intervening components present. Other expressions describing a relationship between components, that is, "between", "just between", "neighboring", and "directly neighboring" are to be interpreted in the same manner.

The terms used herein are used for describing specific embodiments only and are not intended to limit the present disclosure. Singular expressions include plural expressions unless the context explicitly indicates otherwise. In the exemplary embodiment, terms such as "comprise" or "have" are intended to designate the presence of implemented features, numbers, steps, operations, components, parts, or combinations thereof described in the specification and are not to be understood to preclude the presence or additional possibilities of one or more of other features, numbers, steps, operations, components, parts or combinations thereof in advance.

Unless otherwise defined, all terms used herein, including technical or scientific terms, may have the same meanings as are generally understood by those skilled in the art to which an exemplary embodiment of the present disclosure pertains. The terms such as those defined in commonly used dictionaries are to be interpreted as having meanings consistent with their meanings in the context of the related technology and are not to be interpreted in an idealized or overly formal sense unless expressly so defined herein.

The present disclosure will be described in detail by describing exemplary embodiments of the present with reference to the accompanying diagrams in the following. The same reference numerals presented in each drawing refer to the same members.

FIG. 1, FIG. 2, FIG. 3, FIG. 4, and FIG. 5 show that, according to exemplary embodiments of the present disclosure, a universal wheel driving system includes a sun gear S provided to receive power from a power source mounted in a vehicle body BD, a ring gear R which is provided so that a rotation shaft of the ring gear may move relatively to the rotation shaft of the sun gear S on a rotation plane parallel to the rotation plane of the sun gear S and to which wheels are concentrically connected, a gear train 1 configured to form a state in which power continue to be transferred between the sun gear S and the ring gear R while allowing relative motion between the rotation shafts of the sun gear S and the ring gear R, a carrier forming the gear train 1 and supporting a final pinion 9 gear-meshing with the ring gear R so that the rotation shaft position of the final pinion 9 remains unchanged with respect to the rotation shaft position of the ring gear R, and a suspension portion provided between the carrier C and a sleeve SL rotatably supporting an input shaft IS transferring power to the sun gear so that the ring gear R and the carrier C may move up and down with respect to the vehicle body BD.

That is, according to the exemplary embodiments of the present disclosure, a wheel W is connected to the ring gear R and contacts with a road surface, the sun gear S is connected to receive an input of power from a power source provided in the vehicle body BD, and the ring gear R and the carrier C move up and down with respect to the sun gear S through the suspension portions SP.

The carrier C supports a final pinion 9 gear-meshing with the ring gear R so that the rotation shaft position of the final pinion 9 remains unchanged with respect to the rotation shaft position of the ring gear R so that the relative translational motion of the ring gear R is restrained and the carrier C moves up and down together with the ring gear R when the wheel W and the ring gear R move up and down with respect to the sun gear S.

The sun gear S is connected to an input shaft IS supported by the sleeve fixed to the vehicle body BD while remaining concentric with the input shaft IS so that the wheel W, the ring gear R, and the carrier R that move up and down with respect to the sun gear R as described above move up and down with respect to the vehicle body BD.

Furthermore, according to the exemplary embodiments of the present disclosure, the rotation shafts of the sun gear S and the ring gear R are provided to allow for relative displacement while remaining parallel to each other, and power may continue to be transferred between the sun gear S and the ring gear R through the gear train 1 despite the relative displacement of the sun gear S and the ring gear R.

The gear train 1 may be provided through a plurality of links, a connection angle of which varies according to the relative motion between the rotation shafts of the sun gear W and the ring gear R.

The plurality of links may include a first link 3 connected to the rotation shaft of the sun gear S and a second link 5 connected to the first link 3, the first link 3 and the second link 5 are provided with rotation shafts including a series of gears configured to transfer power from the sun gear S to the ring gear R, and a connecting portion between the first link 3 and the second link 5 is provided with a joint pinion 7 having the same number of teeth as the sun gear S.

The second link 5 is provided with a final pinion 9 gear-meshing with the ring gear R, and the final pinion 9 has the same number of teeth as the sun gear S.

Accordingly, the final pinion 9 may transfer power from the sun gear S to the ring gear R by a series of gears through the joint pinion 7, and the sun gear S, the joint pinion 7, and the final pinion 9 all have the same number of teeth.

As described above, both the joint pinion 7 and the final pinion 9, which are even-numbered gears from the sun gear S, among the series of gears forming the gear train 1, need to have the same number of teeth as the sun gear S so that the ring gear R may move relative to the sun gear S without a change in the relative phase of the sun gear S and the ring gear R and power may continue to be stably transferred between the sun gear S and the ring gear R.

The sun gear S and the joint pinion 7 gear-mesh with a first intermediate pinion 11 including a rotation shaft provided in the first link 3, and the joint pinion 7 and the final pinion 9 gear-mesh with a second intermediate pinion 13 including a rotation shaft provided in the second link 5.

Accordingly, the power from the sun gear S may be transferred to the ring gear R through a sequential order of the first intermediate pinion 11, the joint pinion 7, the second intermediate pinion 13, and the final pinion 9.

Figure 5:
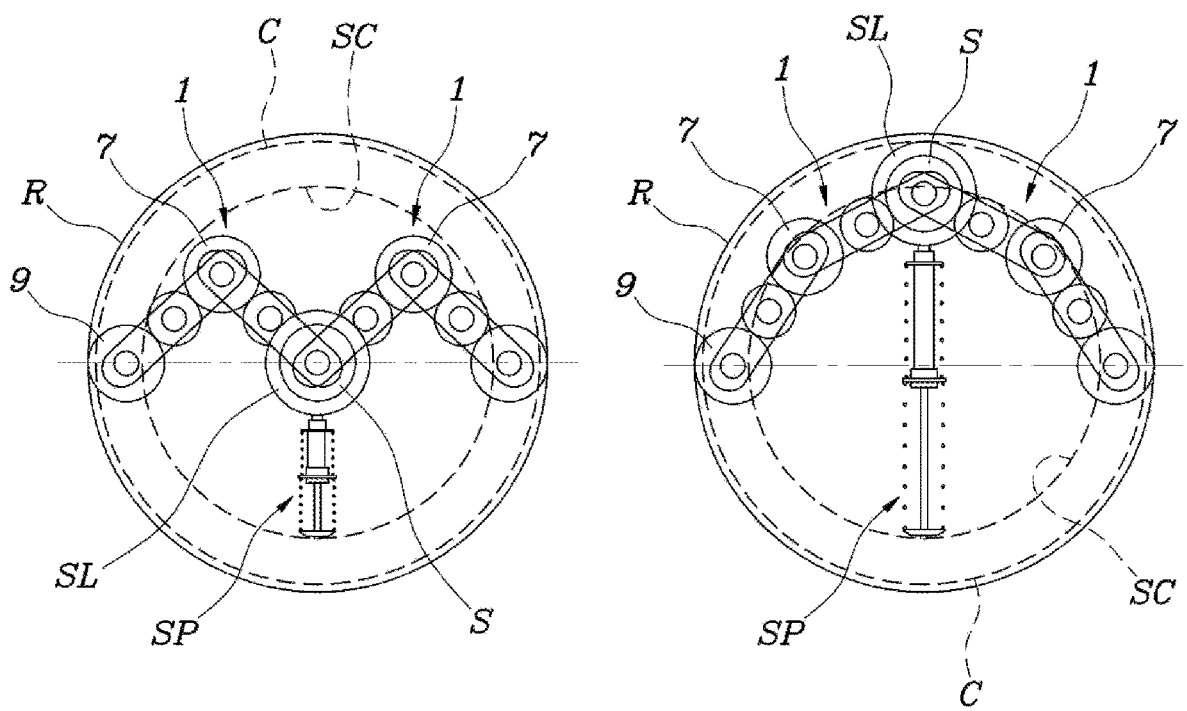
FIG. 5 is a view exemplarily illustrating various exemplary embodiments of a universal wheel driving system according to an exemplary embodiment of the present disclosure.

As illustrated in FIGS. 1 and 5, a plurality of gear trains 1 may be provided in the circumferential direction of the sun gear S, and the final pinions 9 of the plurality of gear trains 1 are rotatably supported by the carrier C so that the relative positions of the final pinions with respect to each other remains unchanged and only rotation is allowed.

According to various exemplary embodiments illustrated in FIG. 1, FIG. 2, FIG. 3, and FIG. 4, two gear trains 1 are provided in axial symmetry around the rotation shaft of the sun gear, the ring gear R gear-meshes with two final pinions 9, the rotation shafts of the final pinions 9 are supported by the carrier so that the rotation shaft position of the ring gear R with respect to the carrier remains unchanged.

Accordingly, when the wheel W connected to the ring gear R moves up and down, the final pinions 9 and the carrier also move up and down, and the up/down movement of the carrier C with respect to the sun gear S is buffered and dampened by the suspension portion SP.

On the other hand, according to various exemplary embodiments illustrated in FIG. 5, two gear trains 1 are symmetrically provided on either side with respect to a straight line passing vertically through the rotation shaft of the sun gear S, and also two final pinions 9 continue to stably gear-mesh with the ring gear R by the carrier C.

It is to be noted that according to the various exemplary embodiments of the present disclosure, a separate balance gear rotatably fixed to the carrier C to support the ring gear R while gear-meshing with the ring gear R may be provided to ensure more robust and stable support of the ring gear R with respect to the carrier C.

Figure 3:
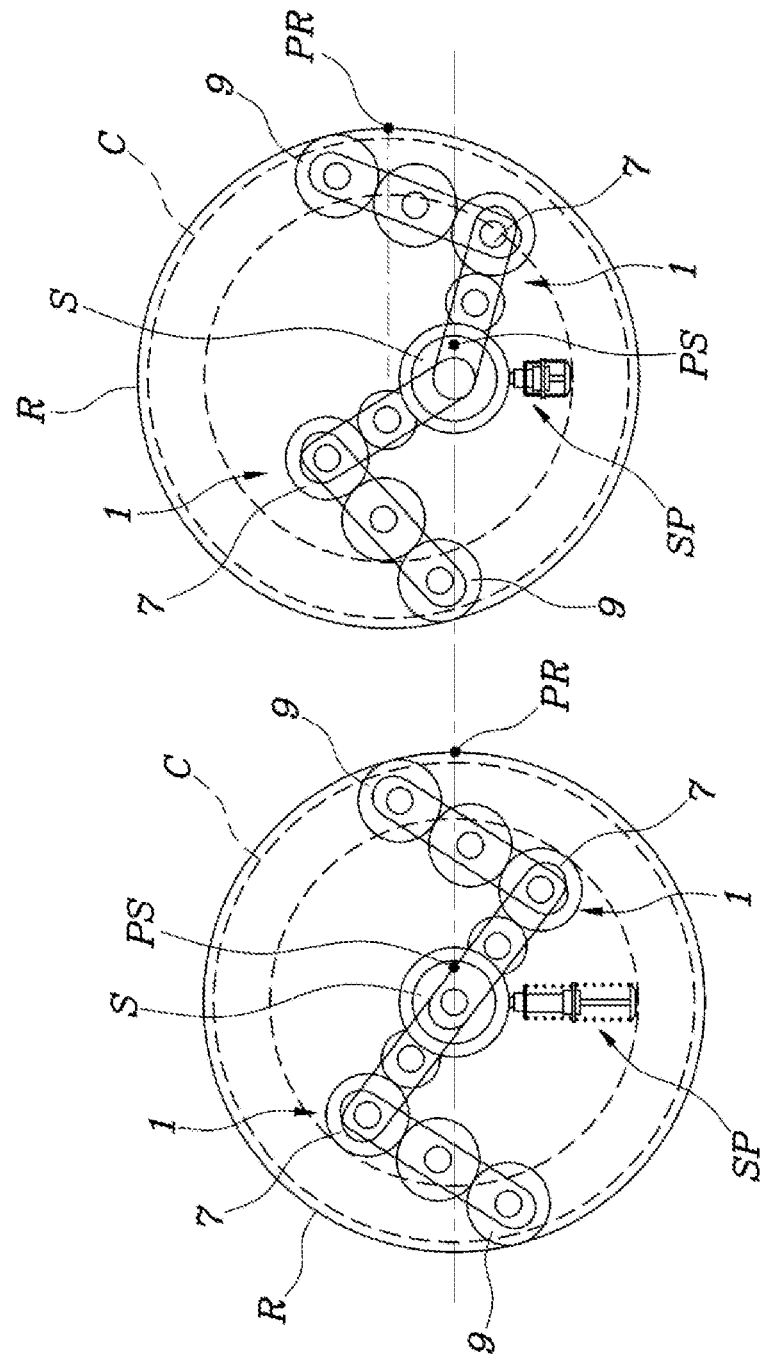
FIG. 3 is a view exemplarily illustrating a state in which a ring rear moves up, as opposed to the state in FIG. 1.
Figure 4:
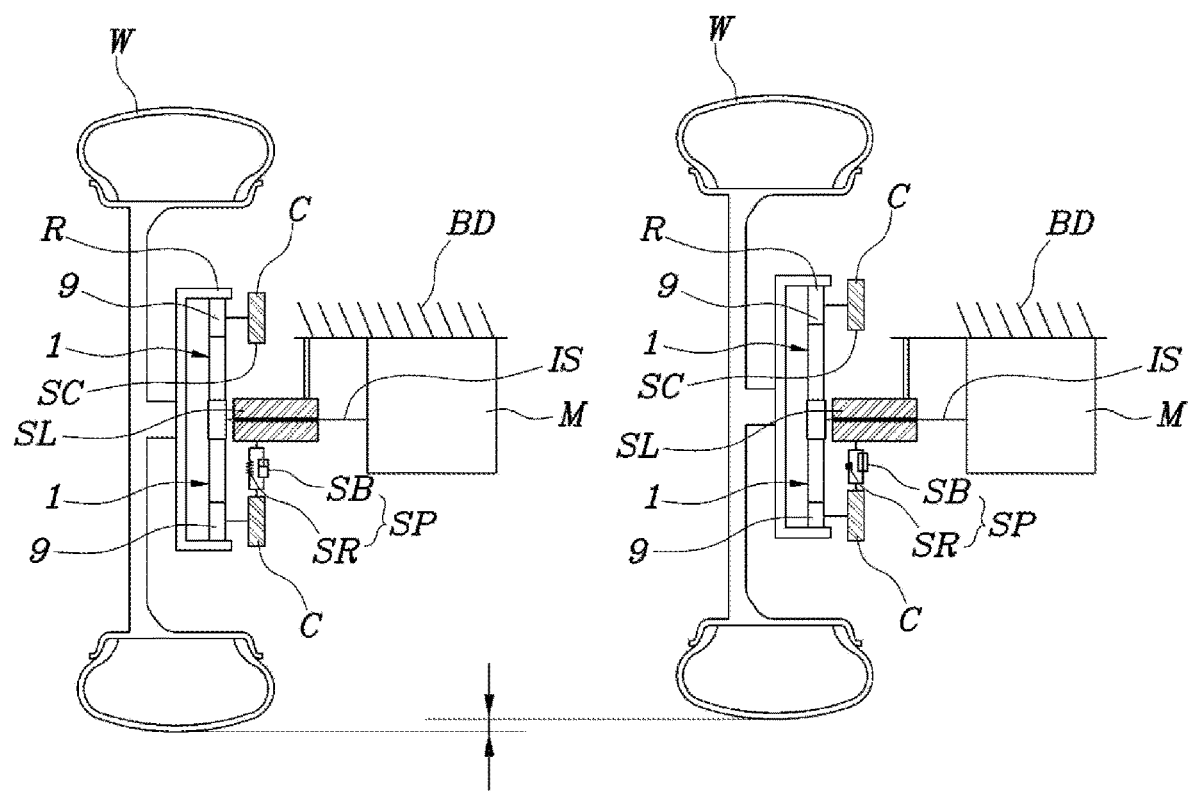
FIG. 4 is a side view exemplarily illustrating the state in FIG. 3, as opposed to the state in FIG. 1.

FIG. 3 and FIG. 4 show that the first intermediate pinions 11 keep gear-meshing with the sun gear S and the final pinions 9 keep gear-meshing with the ring gear R while the angles between the first link 3 and the second link 5 respectively keep changing in the gear trains as the ring gear R moves up and down with respect to the sun gear S so that the power may continue to be transferred between the sun gear S and the ring gear R.

The gear train 1 is configured so that the relative phase of the sun gear S and the ring gear R remains unchanged for the relative motion of the rotation shafts of the sun gear S and the ring gear R.

Here, that the relative phase remains unchanged for the relative motion of the rotation shafts of the sun gear S and the ring gear R may be rephrased as that the zero degree positions, denoted by points PS, PR, of the sun gear S and the ring gear R remain unchanged when the ring gear R moves up and down with respect to the sun gear S in FIG. 3.

That is, when the rotation shafts of the sun gear S and the ring gear R translate with each other on the same plane, the sun gear S and the ring gear R do not rotate with each other by the present translational motion itself.

This means that the sun gear S does not rotate additionally even when the ring gear R connected to the wheel moves up and down as the wheel of the vehicle moves up and down along a bumpy road and that the sun gear torque may be easily and stably controlled by controlling the torque of the motor connected to the sun gear S.

As described above, for the relative phase of the sun gear S and the ring gear R to remain unchanged when the ring gear R moves up and down with respect to the sun gear S, the joint pinion 7 and the final pinion 9, which are even-numbered gears from the sun gear S, among the series of gears forming the gear train 1, need to have the same number of teeth as the sun gear S.

Figure 2:
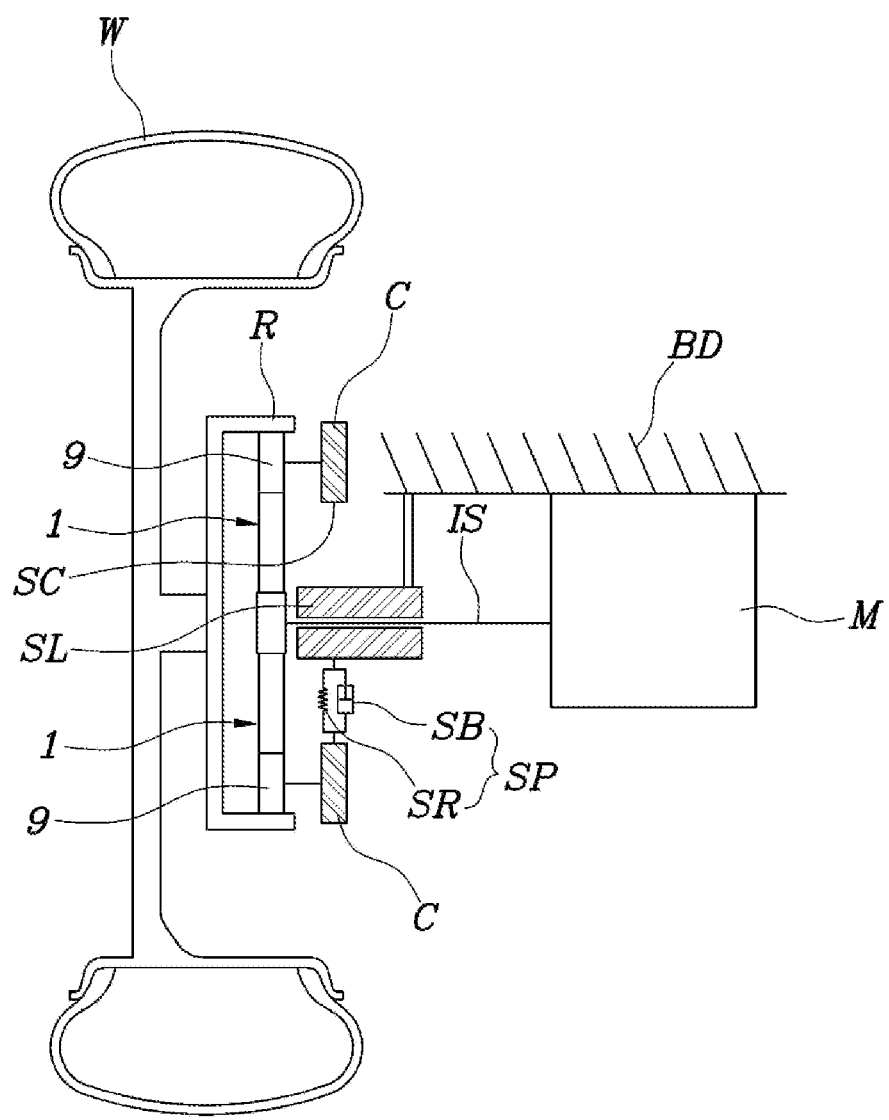
FIG. 2 is a side view exemplarily illustrating the various exemplary embodiments of the universal wheel driving system in FIG. 1.

FIGS. 2 and 4 show that the motor M, which is the power source, is fixed to the vehicle body BD, that the sun gear S is connected to the motor M by the input shaft IS provided concentrically with the rotation axis of the motor, that a wheel W is connected to the ring gear R, and that the carrier C is supported movably up and down with respectable the sun gear S.

When the vehicle travels by the power of the motor M in the state described above, the relative phase between the sun gear S and the ring gear R remains unchanged when the wheel W, the ring gear R, and the carrier C move up and down with respect to the sun gear S so that the power continues to be stably transferred from the motor M to the wheel W through a sequential order of the sun gear S, the gear train 1 and the ring gear R while surging or pitching of the vehicle is prevented.

It is to be noted that the gear train and the suspension module in FIGS. 2 and 4 are conceptually illustrated for better understanding with no regard to the state in FIG. 1.

Figure 6:
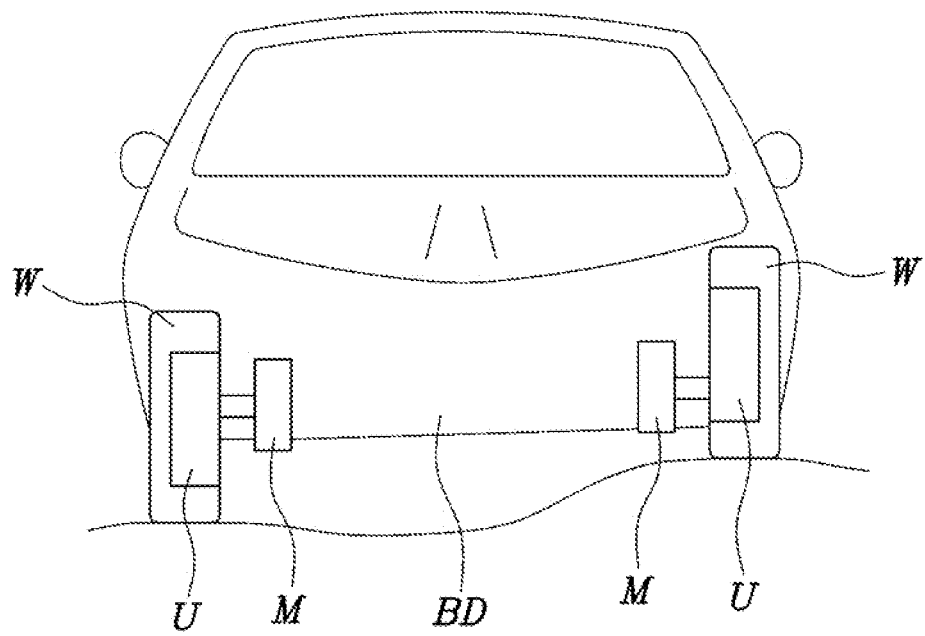
FIG. 6 is a view for describing an application to a vehicle of a universal wheel driving system according to an exemplary embodiment of the present disclosure.

It is to be noted that U in FIG. 6 is a comprehensive representation of the configuration of the universal wheel driving system of the present disclosure minus the motor M and the input shaft IS.

The sun gear S is concentrically connected to the rotation axis of the motor, which is the power source, by the input shaft IS, and the present state holds while the vehicle drives.

That is, as illustrated in FIG. 2, the sun gear S and the input shaft IS do not move up and down with respect to the vehicle body BD and remain concentric even when the wheel W and the ring gear R move up and down according to the bumpy road surface.

The input shaft IS is connected to the sun gear S from the motor M through the carrier C, and the carrier is provided with a space portion SC to avoid interference with the input shaft IS.

That is, the motor M and the sun gear S do not move up and down and remain unchanged with respect to the vehicle body BD even when the ring gear R and the wheel W move up and down with respect to the vehicle body BD so that the carrier is provided with the space portion SC for the input shaft IS connecting the motor M and the sun gear S to avoid interference from the carrier C.

The space portion SC may take the form of a hole as illustrated in the diagram or a groove in the carrier.

The suspension portion SP is elastically provided in up and down direction between the carrier C and a sleeve rotatably supporting the input shaft IS.

That is, the sleeve SL is fixed to the vehicle body BD to support the input shaft IS but that allows a free rotation of the input shaft IS.

The suspension portion SP may include a shock absorber SB and a spring SR provided in parallel to each other between the sleeve SL and the carrier C.

As illustrated in FIG. 1, the suspension portion SP may include a strut in which the shock absorber SB and the spring SR are integrally formed.

The carrier C, the ring gear R, and the wheel W are supported against the sleeve SL by the suspension portion SP, the sleeve SL is fixed to the vehicle body BD so that the wheel consequently supports the vehicle from the road surface through the suspension portion SP, and the shock or vibration input from the wheel to the carrier through the ring gear R is buffered or dampened by the suspension portion SP and transferred to the vehicle body BD.

The speed of the motor M input to the sun gear S may be decelerated and the torque of the motor M be increased and transmitted to the ring gear R so that the universal wheel driving system according to an exemplary embodiment of the present disclosure may ensure excellent hill climbing and acceleration driving performance of the vehicle.

Furthermore, as illustrated in FIG. 6, the motor M may be separately provided outside the wheel which is subject to harsh shocks and vibrations rather than be provided inside the wheel W so that the lifespan of the motor M is increased and the unsprung mass of the vehicle is reduced to ensure excellent driving comfort.

Furthermore, as described above, power may continue to be transferred while the ring gear R connected to the wheel W is allowed to move up and down with respect to the sun gear S connected to the power source so that power may continue to be transferred from the power source in response to the vertical movements of the wheel W without using a conventional cv joint and the like, and accordingly, the space between the power source and the wheel W is reduced to ultimately ensure excellent utilization of the space between the right wheel W and the left wheel W.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof.

What is claimed is:

1. A universal wheel driving system comprising:
a sun gear provided to receive power from a power source mounted in a vehicle body;
a ring gear, wherein a rotation axis of the ring gear is movable relative to a rotation axis of the sun gear and a wheel is concentrically connected to the ring gear;
a gear train engaged to the sun gear and the ring gear and configured to transfer the power between the sun gear and the ring gear while allowing relative motion between the rotation axes of the sun gear and the ring gear;
a carrier supporting a final pinion of the gear train, wherein the final pinion meshes with the ring gear so that a position of a rotation axis of the final pinion remains unchanged with respect to a position of the rotation axis of the ring gear; and
a suspension portion provided to support the carrier against the sun gear so that the ring gear and the carrier move up and down with respect to the vehicle body.

2. The universal wheel driving system of claim 1, wherein the gear train is provided through a plurality of links, a connection angle of which varies according to the relative motion between the rotation axes of the sun gear and the ring gear.

3. The universal wheel driving system of claim 2,
wherein the plurality of links includes a first link, a first end of which is connected to the rotation shaft of the sun gear and a second link connected to a second end of the first link, and
wherein a connecting portion between the second end of the first link and a first end of the second link is provided with a joint pinion having a same number of teeth as the sun gear.

4. The universal wheel driving system of claim 3,
wherein a second end of the second link is provided with the final pinion gear-meshing with the ring gear, and
wherein the final pinion has a same number of teeth as the sun gear.

5. The universal wheel driving system of claim 4, wherein the final pinion transfers the power from the sun gear to the ring gear by a series of gears through the joint pinion.

6. The universal wheel driving system of claim 4, wherein the gear train includes a plurality of gear trains provided in a circumferential direction of the sun gear.

7. The universal wheel driving system of claim 2,
wherein the plurality of links includes a first link, a first end of which is connected to the rotation shaft of the sun gear and a second link connected to a second end of the first link, and
wherein the first link and the second link are provided with rotation shafts and include a series of gears configured to transfer the power from the sun gear to the ring gear.

8. The universal wheel driving system of claim 7, wherein even-numbered gears from the sun gear among the series of gears forming the gear train have a same number of teeth as the sun gear.

9. The universal wheel driving system of claim 8,
wherein a second gear from the sun gear among the series of gears is a joint pinion provided concentrically with rotation axes of the first link and the second link, and
wherein a fourth gear from the sun gear among the series of gears is the final pinion gear-meshing with the ring gear.

10. The universal wheel driving system of claim 9,
wherein the series of gears further includes a first intermediate pinion and a second intermediate pinion,
wherein the sun gear and the joint pinion gear-mesh with the first intermediate pinion including a rotation shaft provided in the first link, and
wherein the joint pinion and the final pinion gear-mesh with the second intermediate pinion including a rotation shaft provided in the second link.

11. The universal wheel driving system of claim 10,
wherein the gear train includes a plurality of gear trains,
wherein the plurality of gear trains is provided in a circumferential direction of the sun gear, and
wherein each of final pinions of the gear trains is supported by the carrier so that relative position of the final pinions with respect to each other remains unchanged.

12. The universal wheel driving system of claim 2,
wherein the gear train includes at least four gears gear-meshed to each other in a row, and
wherein the at least four gears are rotatably supported by the plurality of links connected to each other in a row.

13. The universal wheel driving system of claim 12, wherein the gear train is configured so that a relative phase of the sun gear and the ring gear remains unchanged with respect to the relative motion of the rotation axes of the sun gear and the ring gear.

14. The universal wheel driving system of claim 13, wherein the final pinion gear-meshing with the ring gear among the at least four gears is supported by the carrier so that orbiting of the final pinion around the sun gear is restrained and only rotation thereof is allowed.

15. The universal wheel driving system of claim 1,
wherein the power source is fixed to the vehicle body, and
wherein the sun gear is connected to the power source by an input shaft provided concentrically with a rotation axis of the power source.

16. The universal wheel driving system of claim 15,
wherein the carrier supports a plurality of final pinions of the gear train,
wherein the input shaft is connected to the sun gear through the carrier, and
wherein the carrier is provided with a space portion forming a space to avoid interference with the input shaft.

17. The universal wheel driving system of claim 15, wherein the suspension portion is elastically provided in up and down direction between the carrier and a sleeve to which the input shaft is rotatably mounted.

18. The universal wheel driving system of claim 17, wherein the suspension portion includes a shock absorber and a spring provided in parallel to each other between the sleeve and the carrier.

19. The universal wheel driving system of claim 17, wherein the suspension portion is elastically provided in up and down direction between the carrier and the sleeve which is fixed to the vehicle body to support the input shaft, the sleeve allowing a free rotation of the input shaft therethrough.

20. The universal wheel driving system of claim 1, further including a sleeve which is fixed to the vehicle body to support an input shaft transferring the power to the sun gear, the sleeve allowing free rotation of the input shaft, wherein the suspension portion is provided to support the carrier against the sleeve so that the ring gear and the carrier move up and down with respect to the vehicle body.

* * * * *